No. 754,891. PATENTED MAR. 15, 1904.
T. L. RAY.
MOUSE TRAP.
APPLICATION FILED APR. 5, 1901.
NO MODEL.
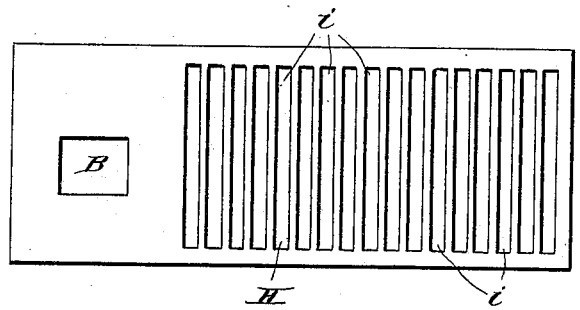
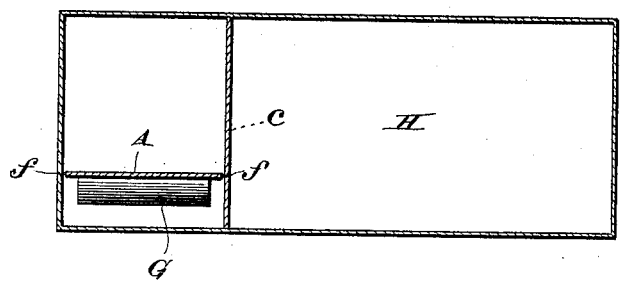  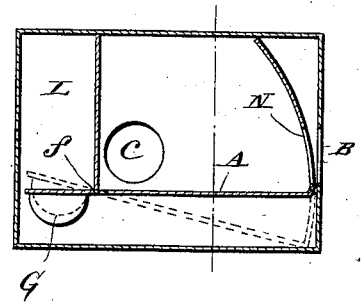
Witnesses:
Inventor:
Thos L. Ray No. 754,891. Patented March 15, 1904.

UNITED STATES PATENT OFFICE.

THOMAS L. RAY, OF FORT WORTH, TEXAS.

MOUSE-TRAP.

SPECIFICATION forming part of Letters Patent No. 754,891, dated March 15, 1904.

Application filed April 5, 1901. Serial No. 54,553. (No model.)

*To all whom it may concern:*

Be it known that I, THOMAS L. RAY, a citizen of the United States, residing at Fort Worth, in the county of Tarrant and State of Texas, have invented a new and useful Mouse-Trap, of which the following is a specification.

My invention relates to improvements in self and ever set mouse-traps having a cage apartment or inclosure to be entered by the mouse through mechanical devices in an adjoining apartment, which devices upon mouse entering close entrance and upon its completing entrance to cage-apartment, taking its weight from mechanism open the entrance, thus resetting the trap; and the objects of my improvement are, first, to provide a simpler and smoother acting device; second, to eliminate the friction and noise accompanying the action of a more complicated device; third, to provide a device that will more effectually prevent the escape of mouse once inside. I attain these objects by the mechanism illustrated in the accompanying drawings, in which—

Figure 1 is a view of the exterior front of trap, showing the entrance B and the windows *i i*. Fig. 2 is a vertical section of interior of trap. Fig. 3 is a vertical section of trap, showing action of mechanism.

Similar letters refer to similar parts throughout the several views.

The plate A is adjusted on the pivot *f* in such a way that the opening N in the said plate A when plate is undisturbed stands exactly opposite and inside opening B through metal front M and with opening B forms the entrance to trap. The weight of mouse entering depresses plate A, so that the part of it extending above openings N and B descends and closes entrance, preventing the escape of mouse, which then enters apartment H through opening C, releasing plate A, which is returned to its former position by the action of the weight G in apartment L, thus opening entrance and resetting trap by bringing openings N and B opposite, the entrance being closed by the weight of mouse attempting to leave the trap preventing escape, as when entering.

I am aware that prior to my invention self and ever set mouse-traps have been made closing entrance thereto by mechanical devices operated by the weight of animal entering the trap, reopening it upon the animal releasing the mechanism by passing into a cage-apartment similar to apartment H through an opening similar to opening C. I therefore do not claim such an invention broadly; but What I do claim as my invention, and desire to secure by Letters Patent, is—

1. A mouse-trap having an apartment for housing a number of mice, an entrance-apartment, and a weighted bar carrying a door normally open, said bar being pivoted whereby the weight of a mouse will close said door whenever the mouse approaches the door in attempts to escape.

2. A mouse-trap having an apartment for housing a number of mice, an entrance-apartment having an opening for entrance therein, and a weighted bar having an opening therethrough registering normally with the opening to said entrance-apartment and carrying a door for automatically closing said opening whenever a mouse approaches said opening in attempts to escape.

3. A mouse-trap having an apartment for housing a number of mice, an entrance-apartment having an opening for entrance therein and an opening for escape to said first-named apartment, and a bar pivotally mounted and having an opening therethrough, said bar being bent upward at the front thereof and carrying a door integral therewith and having the rear end thereof weighted whereby the opening through said bar is made to register normally with the opening into said entrance-apartment.

4. A mouse-trap having an apartment for housing a number of mice, an entrance-apartment having an opening for entrance therein and an opening for escape to said first-named apartment, a bar pivotally mounted, a weight attached to the rear end of said bar, and a door formed integral with the front end of said bar, said bar being bent upward to form said door and having an opening therethrough below said door registering with the entrance-opening to said entrance-apartment.

5. A mouse-trap having an apartment for housing a number of mice, an entrance-apartment provided with an opening for entrance therein and with an opening for escape to said first-named apartment, a bar pivotally mounted and having the rear end thereof weighted, means for preventing mice from going on said weighted end, and a door formed integral with said bar, said bar being bent upward at the front end to form said door and having an opening therethrough below said door registering normally with the entrance-opening to said entrance-apartment whereby the weight of a mouse will automatically close said door whenever the mouse approaches said entrance in attempts to escape.

In testimony whereof I have signed my name to this specification in the presence of two subscribing witnesses.

THOS. L. RAY.

Witnesses:
 EDWIN C. RAY,
 BESSIE IDDINGS RAY.